United States Patent [19]

Imada et al.

[11] 4,307,045

[45] Dec. 22, 1981

[54] METHOD FOR THE IMPROVEMENT OF A GRAMOPHONE RECORD

[75] Inventors: Kiyoshi Imada, Omiya; Susumu Ueno, Ibaraki; Yasuhide Nishina, Ibaraki; Hirokazu Norma, Ibaraki, all of Japan

[73] Assignee: Shin-Etsu Chemical Co., Tokyo, Japan

[21] Appl. No.: 212,196

[22] Filed: Dec. 2, 1980

[30] Foreign Application Priority Data

Dec. 6, 1979 [JP] Japan .................. 54-158943

[51] Int. Cl.$^3$ ............................ B29D 17/00
[52] U.S. Cl. ...................... 264/22; 264/106; 264/233; 425/810
[58] Field of Search ............. 264/22, 25, 106, 107, 264/233; 425/810

[56] References Cited

U.S. PATENT DOCUMENTS 4,157,931 6/1979 Bricot ..................... 264/22 X

*Primary Examiner*—Thomas P. Pavelko
*Attorney, Agent, or Firm*—Toren, McGeady & Stanger

[57] ABSTRACT

The invention provides a novel means for the improvement of the surface properties of a gramophone record made of a vinyl chloride-based resin which is deficient in respect of the susceptibility to electrostatic charging and anti-wearing resistance with consequent noise generation in the playing of the record. The inventive method comprises irradiating the surface of the gramophone record with ultraviolet light having a substantial energy distribution in the wavelength region of 200 nm or shorter in an atmosphere of oxygen or an oxygen-containing gaseous mixture of which the pressure or partial pressure of oxygen is at least 15 Torr. The effect of the ultraviolet irradiation is further enhanced and the durability of the antistatic effect is increased by bringing the ultraviolet-irradiated surface of the gramophone record into contact with a solution containing a surface active agent followed by washing with water and drying.

3 Claims, No Drawings

METHOD FOR THE IMPROVEMENT OF A GRAMOPHONE RECORD

BACKGROUND OF THE INVENTION

The present invention relates to a method for the improvement of a gramophone record. More particularly, the invention relates to a method by which electrostatic charge on the surface of a gramophone record is greatly reduced and the anti-wearing resistance of the gramophone record is remarkably enhanced resulting in decreased noise generation in the playing of the record even after many times of repeated playing.

As is well known, most of the gramophone records in modern times are manufactured with a copolymeric resin of vinyl chloride and vinyl acetate. Despite the many advantages obtained by the use of such a vinyl chloride-based resin, on the other hand, gramophone records made of the resin have several problems due to the relatively poor anti-wearing resistance and high susceptibility to electrostatic charging resulting in the early stain of the surface by the deposition and accumulation of dusts with consequent rapid growth of the noise generation in playing of the record.

Accordingly, it has been an urgent demand to develop an effective method for the improvement of the gramophone records of a vinyl chloride-based resin with respect to the above mentioned problems. For example, there have been proposed various chemical methods for the treatment of the record surface with an object to improve the surface strengths or, in particular, the anti-wearing resistance. Unfortunately, no satisfactory method has been yet developed not only by the reason of insufficient effectiveness of the method but also by the economical reason with increased costs to so large an extent.

In order to prevent electrostatic charging, i.e. accumulation of static electricity, on the surface of a gramophone record, there are known a method of coating the surface with an antistatic agent and a method of incorporating an antistatic agent into the resin composition by blending prior to fabrication of the resin composition into a gramophone record. The former method of coating is effective when instant exhibition of the antistatic effect is desired. The method of coating is, however, defective due to the poor durability of the antistatic effect and the stickiness of the coated surface eventually leading to blocking of the surface-coated gramophone records stacked one on another or kept standing side by side. The latter method of the impregnation of the resin composition with an antistatic agent is insufficient in the effectiveness of the antistatic performance even though more durable than the former method. Increasing of the amount of the antistatic agent in compensation for the insufficient antistatic effect may leads to the appearance of stickiness on the surface consequently with blocking or increased stain of the surface in addition to the disadvantages of poor heat resistance and inferior workability of the resin composition.

SUMMARY OF THE INVENTION

An object of the present invention is therefore to provide a relatively simple and convenient method in view of the above described problems in the prior art methods by which a gramophone record made of a vinyl chloride-based resin is imparted with markedly enhanced surface strengths or, in particular, anti-wearing resistance and the electrostatic charge on the surface is decreased by far.

The method of the present invention for the improvement of the surface properties of a gramophone record made of a vinyl chloride-based resin, which method has been established as a result of the extensive investigations conducted by the inventors with the above mentioned object, comprises a step of irradiating the surface of the gramophone record with ultraviolet light having a substantial energy distribution in the wavelength region of 200 nm or shorter in an atmosphere of oxygen or an oxygen-containing gaseous mixture of which the pressure or partial pressure of oxygen is at least 15 Torr.

The above described method is sufficiently effective at least for a while after the irradiation treatment but the durability of the effect is further improved when the ultraviolet-irradiated surface of the gramophone record is treated or coated with a solution containing a surface active agent.

DETAILED DESCRIPTION OF THE PREFERRED EMBODIMENTS

The method of the present invention is applicable to any gramophone records made of a vinyl chloride-based resin, i.e. a homopolymeric vinyl chloride resin and a copolymeric resin mainly composed of vinyl chloride although a homopolymeric vinly chloride resin is rarely used for the manufacture of gramophone records. The copolymeric resins are produced by the copolymerization of one or more of copolymers such as vinyl acetate, ethylene, propylene and acrylic and methacrylic acids and esters thereof with major amounts of vinyl chloride. Various graft copolymers mainly composed of vinyl chloride are also suitable as a material of gramophone records to be improved by the inventive method.

As is well established in the art, gramophone records are shaped with a resin composition composed of a vinyl chloride-based resin mentioned above as the main component admixed with a variety of additive ingredients such as plasticizers, anti-static agents, stabilizers, lubricants, fillers anti-oxidants, ultraviolet absorbers, pigments, dyes, crosslinking aids and the like according to need. These additive ingredients have no particular adverse effects when the gramophone record is to be treated according to the inventive method. In particular, formulation of an antistatic agent is sometimes effective in enhancing the effectiveness of the inventive method with respect to the antistatic performance. The amount of an antistatic agent to be incorporated into the resin composition, when used, is usually in the range from 0.03 to 1 part by weight per 100 parts by weight of the vinyl chloride-based resin. Types of the antistatic agents, which belong generally to surface active agents, are not particularly limitative including cationic, anionic, non-ionic and amphoteric surface active agents.

The gramophone record fabricated with the above described resin composition is irradiated with ultraviolet light having a substantial energy distribution in the wavelength region of 200 nm or shorter in a specified atmosphere. The light source of the ultraviolet light emitting the light of the wavelengths shorter than 200 nm is not particularly limitative including those emitting line spectra and those emitting ultraviolet light of continuous band in the wavelength region of 200 nm or shorter. In particular, low pressure mercury lamps are suitable for the purpose emitting line spectra at 185 nm, 254 nm, 313 nm and 365 nm with a substantial energy intensity at 185 nm.

When the ultraviolet light has no substantial energy distribution in the wavelength region of 200 nm or shorter, even a prolonged irradiation with the light cannot impart desired antistatic effect and anti-wearing resistance to the surface of the gramophone record and the noise generation in the playing of the record is hardly reduced. In this regard, it is essential that the ultraviolet lamp or, in particular, the window of the lamp is made of a material highly transparent to the ultraviolet light of shorter wavelengths such as quartz, high purity quartz glass, man-made sapphire and the like.

It is essential in the inventive method that the irradiation treatment with ultraviolet light should be carried out in an atmosphere of oxygen or a gaseous mixture containing oxygen of which the pressure or partial pressure of oxygen is at least 15 Torr or, preferably, at least 50 Torr. When this atmospheric condition is not satisfied, the antistatic performance of the gramophone record is hardly improved by the ultraviolet irradiation although the anti-wearing resistance can be improved to a considerable extent so that, as a consequence, noise generation in the playing of the record can be reduced insufficiently. From the standpoint of practical purpose, it is the most convenient way to carry out the ultraviolet irradiation in air under atmospheric pressure with sufficiently high effects of the improvement of the antistatic performance and the anti-wearing resistance of the gramophone record.

As is readily understood, it is a general practice in most cases of ultraviolet irradiation treatment of a material to improve certain properties thereof that the material under treatment is brought close to the ultraviolet lamp as close as possible in so far as no troubles are caused in handling the material and the lamp in consideration of the rapidly decreasing intensity of the light energy as the distance between the material and the lamp increases. On the contrary, it is a surprising discovery that the effect of imparting antistatic effect to the gramophone record is unexpectedly decreased when the distance between the lamp and the record is too small below a certain limit with rather increased noise generation in playing of the record. As is presumable from the electron microscopic photographs of the fractured surface of the treated records and other evidences, this unexpected phenomenon is due to the undesirable destruction or degradation taking place in the surface layer in concurrence with the modification of the surface properties by the ultraviolet light in the desirable direction.

Although the above described inverse relationship between the distance of irradiation and the effectiveness of the irradiation treatment is an experimentally established fact, it is a very difficult problem to give a definite criterion of the optimum intensity of the ultraviolet light generally applicable to all cases because of the lack of a convenient and accurate technical means for the dosimetry of the ultraviolet light, especially, in the shorter wavelength region. Therefore, it is a practical and recommendable way that the distance between the gramophone record under treatment and the ultraviolet lamp and the time of the irradiation treatment are determined by a preliminary experimentation for the individual cases in consideration of the type and power of the lamp as well as the geometry of the disposition of the lamp and record. For example, the distance between the lamp and the record is in the range from 0.5 to 50 cm as a rough measure and the time or irradiation is in the range from a few tens of seconds to several tens of minutes.

When a durability of the effects obtained by the treatment of irradiation with ultraviolet light is desired, the irradiation-treated gramophone record is further subjected to the treatment with a solution containing a surface active agent, i.e. the record is brought into contact with the solution by spraying, dipping or other suitable methods. This treatment with a surface active agent is effective in increasing the antistatic effect and the anti-wearing resistance of the irradiation-treated gramophone record resulting in marked reduction of the noise generation in addition to the prolongation of the antistatic effect over a long period of time.

The surface active agents suitable for use in the above mentioned secondary treatment succeeding the ultraviolet irradiation include anionic surface active agents exemplified by sulfonated oils, metal soaps, sulfonated ester oils, sulfonated amide oils, sulfonated ester salts of olefins, sulfonated ester salts of aliphatic alcohols, salts of alkylsulfonic acid esters, ethylsulfonate salts of fatty acids, salts of alkylsulfonic acids, salts of alkylnaphthalenesulfonic acids salts of alkylbenzenesulfonic acids, reaction products of naphthalenesulfonic acid and formalin, ester sulfonic acid salts of succinic acid, ester salts of phosphoric acid and the like; nonionic surface active agents exemplified by fatty acid esters of polyvalent alcohols, ethylene oxide addition products of aliphatic alcohols, ethylene oxide addition products of fatty acids, ethylene oxide addition products of aliphatic amines or fatty acid amides, ethylene oxide addition products of alkylphenols, ethylene oxide addition products of alkylnaphthols, ethylen oxide addition products of partial esters of fatty acids and polyvalent alcohols, polyethyleneglycols and the like; and amphoteric surface active agents exemplified by those of carboxylic acid type such as betaine type ones, those of sulfuric acid ester salt type such as hydroxyethyl imidazoline sulfuric acid esters and the like, those of sulfonic acid type such as taurine condensation succinic acid esters, imidazoline sulfonic acids and the like.

The above named surface active agents are used usually in the form of an aqueous solution but the solution may contain a water-miscible organic solvent such as alcohols, ketone solvents, ester solvents and the like, if necessary. The ultraviolet-irradiated gramophone record is brought into contact with the solution of the surface active agent by coating, e.g. brushing or spraying, dipping or any other conventional means followed by, if necessary, washing with water and drying.

In the following, the procedure and the effectiveness of the inventive method are described in further detail by way of examples and comparative examples. In each of the experiments given below, the light source of ultraviolet light was always a low pressure mercury lamp which was a sealed tube of high quality quartz glass (Suprasil glass, a tradename by Heraeus Co., West Germany) filled with mercury vapor and argon gas with different power placed at a varied distance above the gramophone record to be irradiated.

The formulations of the resin compositions used for the fabrication of the gramophone records used in Experiments No. 1 to No. 9, No. 10 and No. 11 to No. 13 were as follows.

The gramophone records used in Experiments No. 1 to No. 9 were prepared with a resin composition composed of 100 parts by weight of a copolymer resin of vinyl chloride and vinyl acetate (SC-400G, a tradename by Shin-Etsu Chemical Co., Japan), 0.8 part by weight of an epoxy-modified soybean oil, 0.2 part by weight of a cationic surface active agent of quaternary ammonium salt type (Catanac SN, a tradename by American Cyanamid Co., U.S.A.), 1.5 parts by weight of dibutyltin mercaptide and 0.1 part by weight of carbon black by pressing the resin composition in a record press at 165° C. following a preheating at 140° C.

The gramophone records used in Experiment No. 10 were prepared with a resin composition composed of 100 parts by weight of a copolymer resin of vinyl chloride and vinyl acetate (SC-500T, a tradename by Shin-Etsu Chemical Co., supra), 1 part by weight of an epoxy-modified soybean oil, 1 part by weight of dibutyltin mercaptide, 0.2 part by weight of calcium stearate and 0.2 part by weight of barium stearate by pressing the resin composition in a record press at 170° C. following a preheating at 145° C.

The gramophone records used in Experiments No. 11 to No. 13 were prepared with a resin composition composed of 100 parts by weight of a copolymer resin of vinyl chloride and vinyl acetate (SC-400G, supra), 1 part by weight of an epoxy-modified soybean oil, 0.8 part by weight of dibutyltin mercaptide, 0.5 part by weight of calcium stearate and 0.1 part by weight of carbon black by pressing the resin composition in a record press at 160° C. following a preheating at 140° C.

The atmosphere in which the gramophone record was irradiated with ultraviolet light in each of Experiments No. 2 to No. 10 was as shown in Table 1 below together with the power of the low pressure mercury lamp in watts, distance between the lamp and the record under irradiation in cm and the length of the irradiation time in minutes. In Experiment No. 10, the vessel in which the lamp and the record were placed was first evacuated to a vacuum of 0.001 Torr and then oxygen was introduced into the vessel up to a pressure of 200 Torr.

In Experiment No. 3, a Vycor glass filter was inserted between the lamp and the record under irradiation so as that the ultraviolet light of wavelengths of 200 nm or shorter did not reach the record.

TABLE 1

| Experiment No. | Power of UV lamp, watts | Distance between lamp and record, cm | Length of irradiation time, minutes | Atmosphere of irradiation |
|---|---|---|---|---|
| 2 | 20 | 2.0 | 10 | Air, atmospheric pressure |
| 3 | 20 | 2.0 | 10 | Air, atmospheric pressure* |
| 4 | 500 | 30 | 5 | Air, atmospheric pressure |
| 5 | 500 | 70 | 15 | Air under reduced pressure, oxygen partial pressure 50 Torr |
| 6 | 50 | 2.0 | 5 | Air under reduced pressure, oxygen partial pressure 10 Torr |
| 7 | 50 | 0.5 | 5 | Air under reduced pressure, oxygen partial pressure 100 Torr |
| 8 | 50 | 2.0 | 5 | Air under reduced pressure, oxygen partial pressure 100 Torr |
| 9 | 50 | 0.2 | 5 | Air under reduced pressure, oxygen partial pressure 100 Torr |
| 10 | 20 | 5.0 | 15 | Oxygen, 20 Torr |

*A Vycor glass filter was placed between the UV lamp and record.

The gramophone records either before ultraviolet irradiation (Experiment No. 1) or after the ultraviolet irradiation (Experiments No. 2 to No. 10) as shown in Table 1 were subjected to the measurements of the electrostatic charge voltage in volts by rubbing the surface with a dry cotton cloth for 30 seconds at a rate of 12.5 times per second and the SN (signal/noise) ratios in dB in the lead-in portion or in the lead-out portion either directly after the irradiation treatment or after wearing by 100 times of playing of the record. The results are summarized in Table 2 below with remarks.

TABLE 2

| Experiment No | Charge voltage by rubbing, volts | SN ratio, dB Lead-in As irradiated | SN ratio, dB Lead-in After wearing | SN ratio, dB Lead-out As irradiated | SN ratio, dB Lead-out After wearing | Remarks Antistatic performance | Remarks Anti-wearing resistance |
|---|---|---|---|---|---|---|---|
| 1 | 3400 | 56.0 | 53.0 | 57.0 | 53.5 | Poor | Poor |
| 2 | 450 | 58.0 | 58.0 | 59.0 | 59.0 | Good | Good |
| 3 | 2950 | 55.0 | 52.0 | 55.5 | 53.0 | Poor | Poor |
| 4 | 900 | 57.5 | 57.5 | 59.0 | 59.0 | Good | Good |
| 5 | 3500 | 55.5 | 53.0 | 56.5 | 53.5 | Poor | Poor |
| 6 | 3100 | 56.0 | 56.0 | 57.0 | 57.0 | Poor | |
| 7 | 1050 | 55.0 | 55.0 | 56.5 | 56.5 | (*) | |
| 8 | 600 | 58.0 | 58.0 | 59.0 | 59.0 | Good | Good |
| 9 | 2650 | 53.0 | 50.5 | 54.0 | 51.0 | Poor | Poor |
| 10 | 550 | 58.0 | 58.0 | 59.0 | 59.0 | Good | Good |

(*) The SN ratios as UV-irradiated were somewhat porr.

In the next place, the effectiveness of the secondary treatment of the ultraviolet-irradiated gramophone records with a solution of a surface active agent was examined (Experiments No. 11 to No. 13).

In Experiment No. 11, the gramophone record was irradiated with a 20 watts low pressure mercury lamp placed 2.0 cm apart from the record for 10 minutes in air under atmospheric pressure and the thus ultraviolet-irradiated record was immediately coated with a 2% aqueous solution of a cationic surface active agent (Catanac SN, supra) immediately followed by washing with water and drying.

The thus obtained gramophone record was subjected to the measurement of the charge voltage by rubbing in the same manner as in the preceding experiments directly after the treatment as well as after 1 month, 3 months or 6 months of storage in an atmosphere of 60% relative humidity at 25° C. The results are given in Table 3 below.

In Experiment No. 12, which was a comparative experiment, the gramophone record was irradiated with ultraviolet light in just the same manner as in Experiment No. 11 but the secondary treatment with the solution of the surface active agent was not undertaken. The results of the measurements of the charge voltage by rubbing are also given in Table 3.

In Experiment No. 13, the gramophone record was first irradiated with a 50 watts low pressure mercury lamp placed 5.0 cm apart from the record for 10 minutes in air under a reduced pressure with the oxygen partial pressure of 70 Torr.

Then a 1% aqueous solution of an anionic surface active agent (Emal TD, a tradename by Kao Atlas Co., Japan) was sprayed to the ultraviolet-irradiated surface of the record immediately followed by washing with water and drying. The results of the measurements of the charge voltage by rubbing, carried out in the same manner as in Experiment No. 11, as shown in Table 3.

TABLE 3

| Experiment No. | Charge voltage by rubbing, volts | | | |
|---|---|---|---|---|
| | As treated | After 1 month | After 3 months | After 6 months |
| 11 | 370 | 660 | 690 | 760 |
| 12 | 680* | 2600 | 3500 | 3800 |
| 13 | 420 | 720 | 730 | 780 |

*Directly after irradiation with ultraviolet light

What is claimed is:
1. A method for the improvement of the surface properties of a gramophone record made of a vinyl chloride-based resin which comprises the step of irradiating the surface with ultraviolet light having a substantial energy distribution in the wavelength region of 200 nm or shorter in an atmosphere of oxygen or an oxygen-containing gaseous mixture of which the pressure or partial pressure of oxygen is at least 15 Torr.
2. A method for the improvement of the surface properties of a gramophone record made of a vinyl chloride-based resin which comprises the steps of
    (a) irradiating the surface with ultraviolet light having a substantial energy distribution in the wavelength region of 200 nm or shorter in an atmosphere of oxygen or an oxygen-containing gaseous mixture of which the pressure or partial pressure of oxygen is at least 15 Torr, and
    (b) bringing the surface thus irradiated with ultraviolet light into contact with a solution containing a surface active agent and drying.
3. The method as claimed in claim 1 or claim 2 wherein the pressure or partial pressure of oxygen in the atmosphere is at least 50 Torr.

* * * * *

UNITED STATES PATENT OFFICE
CERTIFICATE OF CORRECTION

Patent No. 4,307,045             Dated December 22, 1981

Inventor(s) Kiyoshi Imada et al

It is certified that error appears in the above-identified patent and that said Letters Patent are hereby corrected as shown below:

In the heading of the patent [54] should read as follows:

[54] Inventors: Kiyoshi Imada, Omiya; Susumu Ueno, Ibaraki; Yasuhide Nishina, Ibaraki; Hirokazu Nomura, Ibaraki, all of Japan Signed and Sealed this Twentieth Day of April 1982

|SEAL|

Attest:

GERALD J. MOSSINGHOFF

Attesting Officer        Commissioner of Patents and Trademarks